US012574883B2

(12) United States Patent
Salkintzis

(10) Patent No.: US 12,574,883 B2
(45) Date of Patent: Mar. 10, 2026

(54) ESTABLISHING AN ADDITIONAL REGISTRATION WITH A MOBILE NETWORK

(71) Applicant: Lenovo (Singapore) Pte. Ltd., New Tech Park (SG)

(72) Inventor: Apostolis Salkintzis, Athens (GR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 224 days.

(21) Appl. No.: 18/558,136

(22) PCT Filed: Apr. 29, 2021

(86) PCT No.: PCT/EP2021/061213
§ 371 (c)(1),
(2) Date: Oct. 30, 2023

(87) PCT Pub. No.: WO2022/228673
PCT Pub. Date: Nov. 3, 2022

(65) Prior Publication Data
US 2024/0236906 A1 Jul. 11, 2024

(51) Int. Cl.
*H04W 60/00* (2009.01)
*H04W 12/041* (2021.01)
*H04W 12/06* (2021.01)
*H04W 48/18* (2009.01)

(52) U.S. Cl.
CPC ....... *H04W 60/005* (2013.01); *H04W 12/041* (2021.01); *H04W 12/06* (2013.01); *H04W 48/18* (2013.01)

(58) Field of Classification Search
CPC . H04W 60/005; H04W 12/041; H04W 12/06; H04W 12/106; H04W 88/10
See application file for complete search history.

(56) References Cited

PUBLICATIONS

PCT/EP2021/061213, "Notification of Transmittal of the International Search Report and the Written Opinion of the International Searching Authority, or the Declaration", International Searching Authority, Feb. 18, 2022, pp. 1-22.
Nokia et al., "Support of different slices over different Non 3GPP access", SA WG2 Meeting #143e S2-2102064, Feb. 24-Mar. 9, 2021, pp. 1-8.

(Continued)

*Primary Examiner* — Jamal Javaid
(74) *Attorney, Agent, or Firm* — Kunzler Needham & Hilton

(57) ABSTRACT

Apparatuses, methods, and systems are disclosed for establishing multiple concurrent registrations with a mobile network. One apparatus includes a network interface and a processor that receives a first registration request message from a remote unit via a first interworking function ("IWF") and sends a first registration accept message to the remote unit via the first IWF, the registration accept message establishing a first registration between the remote unit and a mobile communication network via the first IWF. The processor receives a second registration request message from the remote unit via a second IWF and sends a second registration accept message to the remote unit via the second IWF, the second registration accept message establishing a second registration between the remote unit and the network via the second IWF, where the second registration is in addition to the first registration.

20 Claims, 10 Drawing Sheets

(56) References Cited

PUBLICATIONS

SA WG2, "CRs to 23.167, 23.228, 23.501, 23.502, 23.503 (TEI17_XXX, Rel-17)", TSG SA Meeting #SP-91E SP-210088, Mar. 18-29, 2021, pp. 1-159.

3GPP, "3rd Generation Partnership Project; Technical Specification Group Services and System Aspects; Procedures for the 5G System (5GS); Stage 2 (Release 17)", 3GPP TS 23.502 V17.0.0, Mar. 2021, pp. 1-646.

700

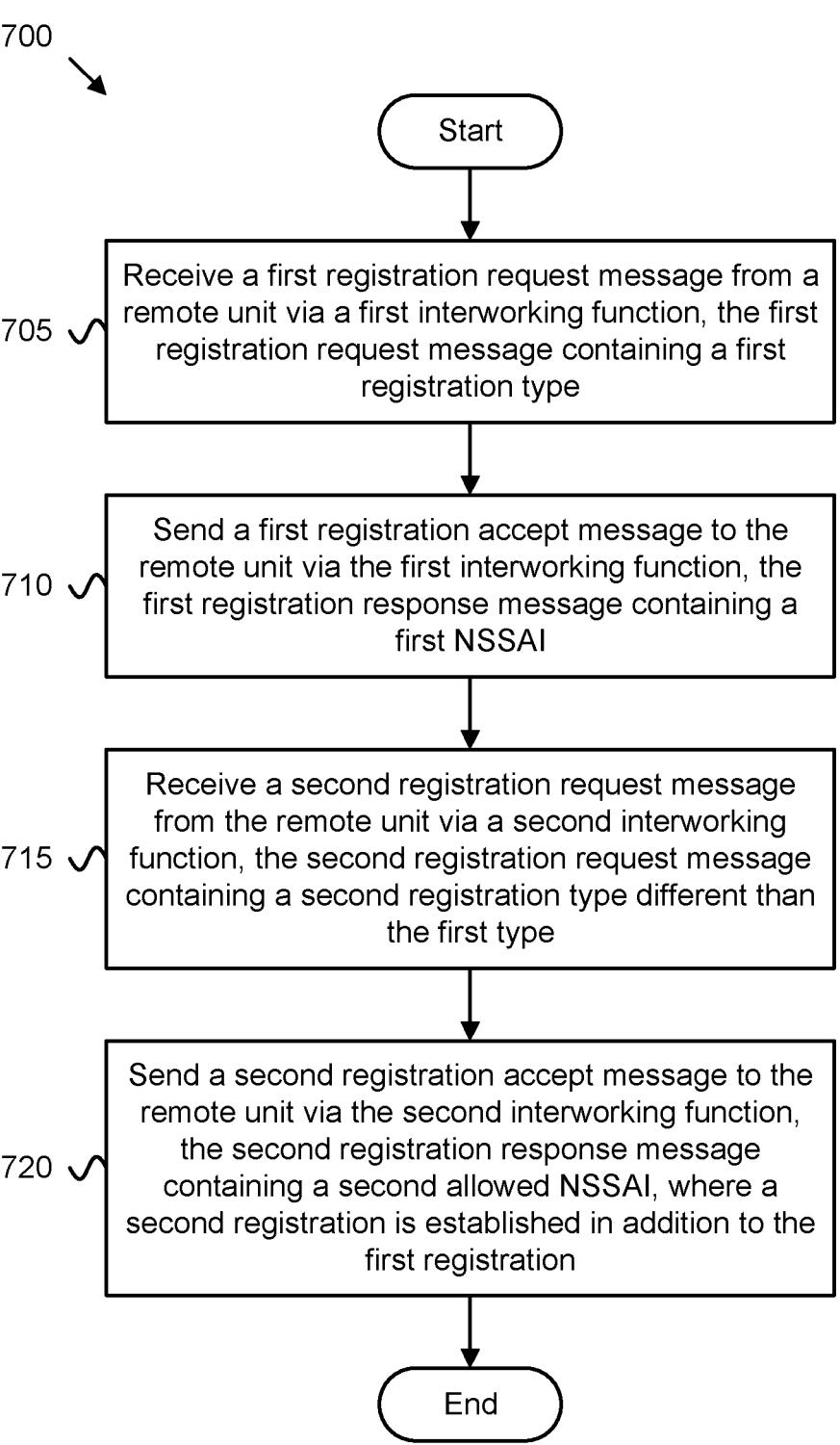

Start

705 — Receive a first registration request message from a remote unit via a first interworking function, the first registration request message containing a first registration type 710 — Send a first registration accept message to the remote unit via the first interworking function, the first registration response message containing a first NSSAI 715 — Receive a second registration request message from the remote unit via a second interworking function, the second registration request message containing a second registration type different than the first type 720 — Send a second registration accept message to the remote unit via the second interworking function, the second registration response message containing a second allowed NSSAI, where a second registration is established in addition to the first registration End

FIG. 7

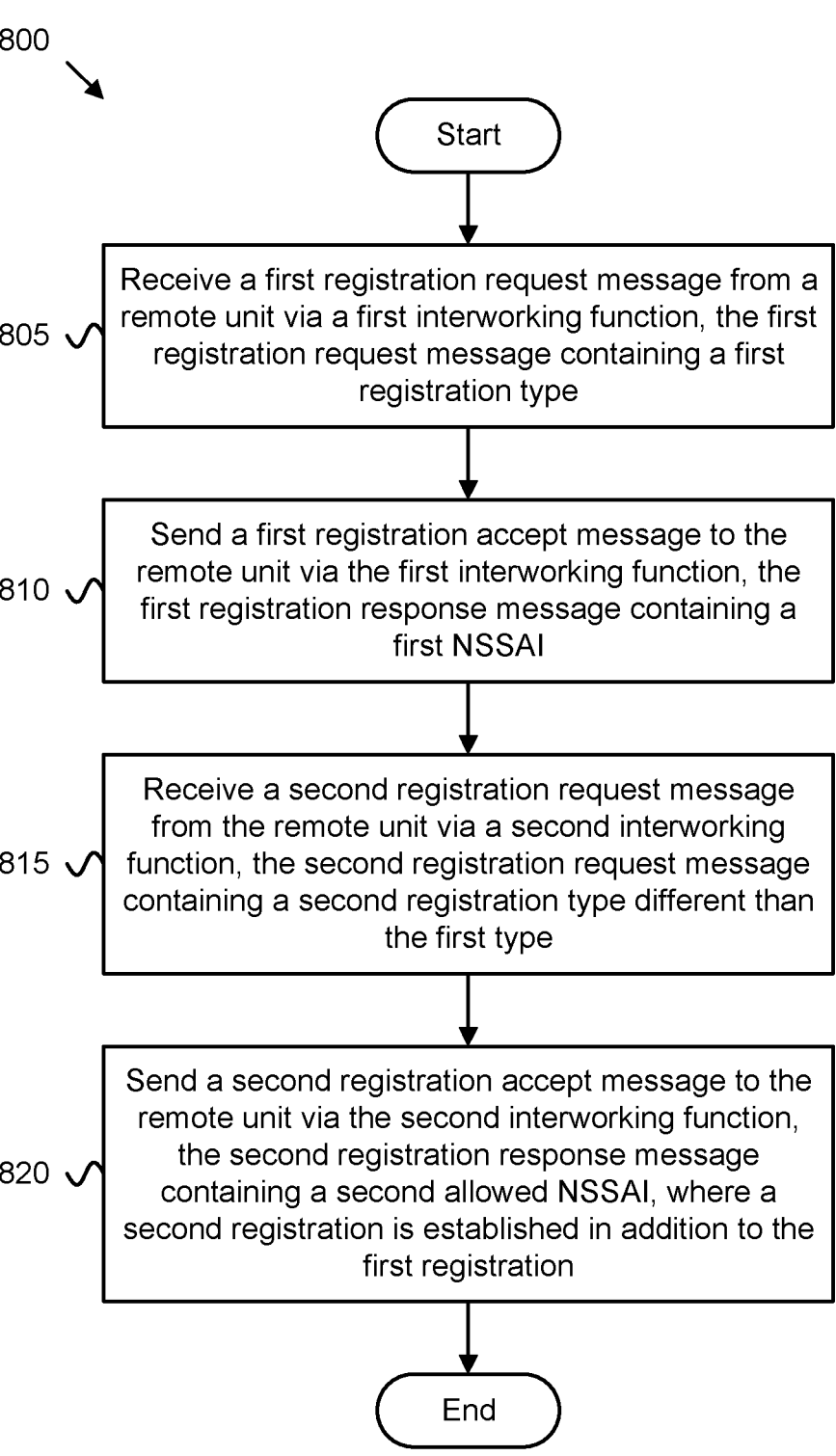

800

Start

805 — Receive a first registration request message from a remote unit via a first interworking function, the first registration request message containing a first registration type 810 — Send a first registration accept message to the remote unit via the first interworking function, the first registration response message containing a first NSSAI 815 — Receive a second registration request message from the remote unit via a second interworking function, the second registration request message containing a second registration type different than the first type 820 — Send a second registration accept message to the remote unit via the second interworking function, the second registration response message containing a second allowed NSSAI, where a second registration is established in addition to the first registration End

FIG. 8

ESTABLISHING AN ADDITIONAL REGISTRATION WITH A MOBILE NETWORK

FIELD

The subject matter disclosed herein relates generally to wireless communications and more particularly relates to establishing multiple concurrent registrations with a mobile network.

BACKGROUND

In certain wireless communication systems, a User Equipment device ("UE") is able to connect with a fifth-generation ("5G") core network (i.e., "5GC") via a non-3GPP access network using a Non-3GPP Interworking Function ("N3IWF"). However, currently the UE can connect to the 5GC via one N3IWF only.

BRIEF SUMMARY

Disclosed are procedures for establishing multiple concurrent registrations with a mobile network. Said procedures may be implemented by apparatus, systems, methods, and/or computer program products.

One method of an access management function includes receiving a first registration request message from a remote unit via a first interworking function in a mobile communication network and sending a first registration accept message to the remote unit via the first interworking function, where the first interworking function supports a first set of network slices. Here, the first registration request message contains a first registration type and the first registration accept message contains a first allowed network slice section assistance information ("NSSAI"). The first registration accept message establishes a first registration between the remote unit and the mobile communication network via the first N3IWF. Here, the first registration enables the remote unit to access a first subset of network slices identified by the first allowed NSSAI, where the first subset includes one or more slice identifiers from the first set of network slices supported by the first interworking function.

The first method further includes receiving a second registration request message from the remote unit via a second interworking function sending a second registration accept message to the remote unit via the second interworking function, where the second interworking function supports a second set of network slices. Here, the second registration request message contains a second registration type different from the first registration type, and the second registration accept message contains a second allowed NSSAI. The second registration accept message establishes a second registration between the remote unit and the mobile communication network via the second interworking function in addition to the first registration, i.e., without replacing or otherwise impacting the first registration. Here, the second registration enables the remote unit to access a second subset of network slices identified by the second allowed NSSAI, where the second subset includes one or more slice identifiers from the second set of network slices supported by the second interworking function.

A second method of a User Equipment device ("UE") includes sending a first registration request message to an access management function in a mobile communication network via a first interworking function in the mobile communication network and receiving a first registration accept message from the access management function via the first interworking function, where the first interworking function supports a first set of network slices. Here, the first registration request message contains a first registration type and the first registration accept message contains a first allowed NSSAI. The first registration accept message establishes a first registration between the apparatus and the mobile communication network via the first interworking function. Here, the first registration enables the UE to access a first subset of network slices identified by the first allowed NSSAI, where the first subset includes one or more slice identifiers from the first set of network slices supported by the first interworking function.

The second method further includes sending a second registration request message to the access management function via a second interworking function and receiving a second registration accept message from the access management function via the second interworking function, where the second interworking function supports a second set of network slices. Here, the second registration request message contains a second registration type different from the first registration type and the second registration accept message contains a second allowed NSSAI. The second registration accept message establishes a second registration between the apparatus and the mobile communication network via the second interworking function, where the second registration is in addition to the first registration. Here, the second registration enables the UE to access a second subset of network slices identified by the second allowed NSSAI, where the second subset includes one or more slice identifiers from the second set of network slices supported by the second interworking function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a flowchart diagram illustrating one embodiment of a method for establishing multiple concurrent registrations with a mobile network; and FIG. 8 is a flowchart diagram illustrating one embodiment of a method for establishing multiple concurrent registrations with a mobile network.

DETAILED DESCRIPTION

Figure 1:
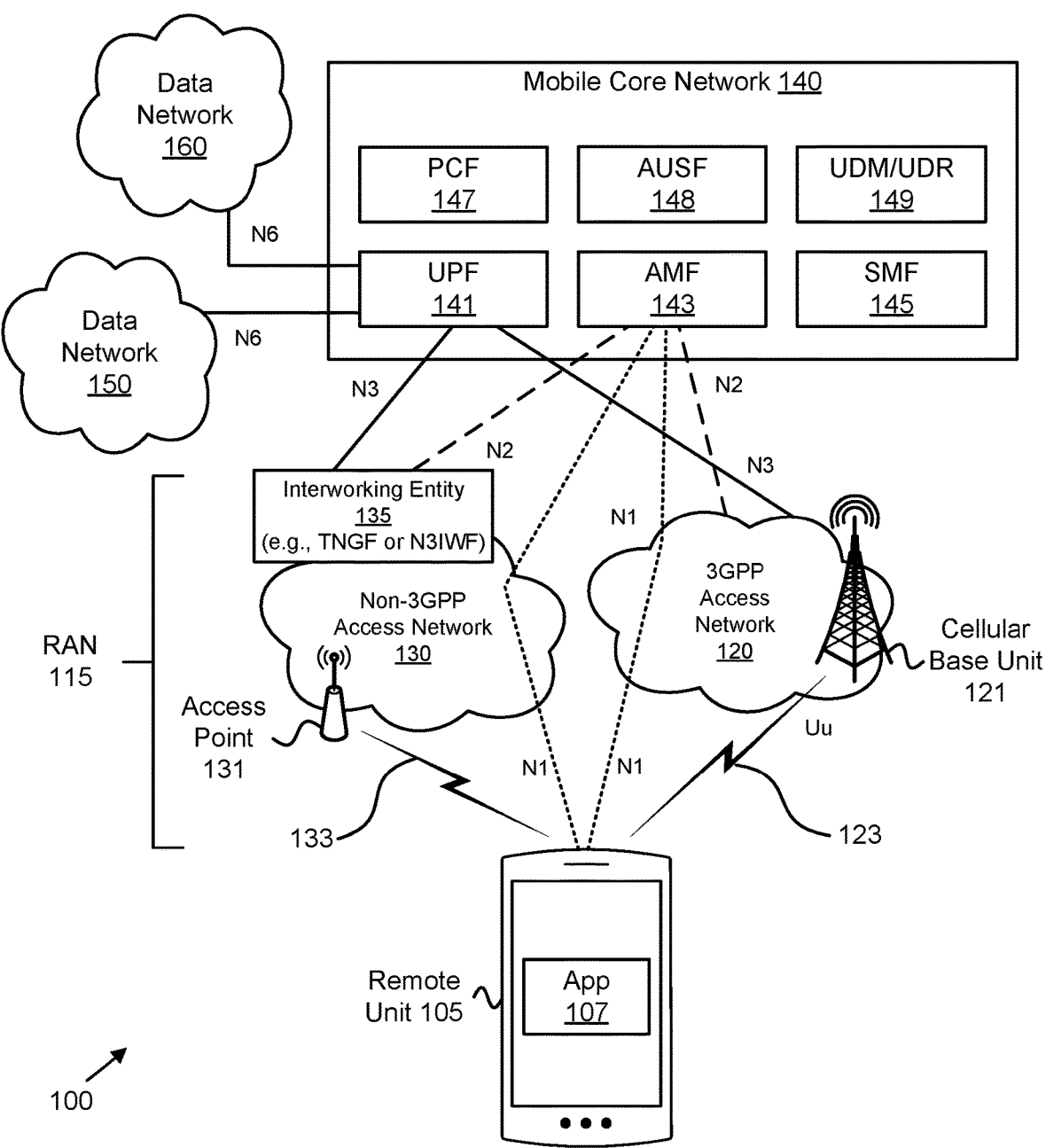
FIG. 1 is a schematic block diagram illustrating one embodiment of a wireless communication system for establishing multiple concurrent registrations with a mobile network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, or a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C." includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for establishing multiple concurrent registrations with a mobile network. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Currently, a User Equipment ("UE") can connect to a Fifth Generation ("5G") core network via one non-3GPP interworking function ("N3IWF") only. This has been no problem so far because all N3IWFs were identical and each one was able to provide access to any network slice in the 5G core network. Therefore, via any single N3IWF, the UE was able to simultaneously access multiple network slices in the 5G core network.

However, in 3GPP Rel-17 all N3IWFs may not be identical anymore. For example, one N3IWF could provide access only to network slices identified with S-NSSAI-a, while another N3IWF could provide access only to other network slices identified with S-NSSAI-b.

Therefore, when a UE wants to connect over non-3GPP access to multiple network slices simultaneously, the UE may need to simultaneously connect to the 5G core network via multiple N3IWFs. This capability is not currently supported, and the objective of the present disclosure is to define how this simultaneous connection to a 5G core network via multiple N3IWFs can be achieved.

The scenario enabled by the solution in this disclosure is summarized below:

A UE wants to connect over non-3GPP access to a first network slice, identified by a first S-NSSAI. This may be triggered by URSP rules in the UE. The UE discovers a first N3IWF supporting access to the first S-NSSAI. The UE performs a first 5G registration via the first N3IWF and establishes a first PDU Session via the first N3IWF that is associated with the first S-NSSAI. Now, the UE has connectivity to the first network slice identified by the first S-NSSAI.

The UE wants to connect over non-3GPP access to a second network slice, identified by a second S-NSSAI. Again, this may be triggered by URSP rules in the UE. The UE identifies that the first registration (e.g., the first N3IWF) cannot support the second S-NSSAI. The UE discovers a second N3IWF supporting access to the second S-NSSAI.

The UE performs a second 5G registration via the second N3IWF and establishes a second PDU Session via the second N3IWF that is associated with the second S-NNSAI. The UE keeps both the first and the second registrations active, i.e., the UE is simultaneously registered to the same mobile network via multiple N3IWFs and is simultaneously connected to different network slices via different N3IWFs.

To allow a UE to simultaneously connect to the 5G core network via multiple N3IWFs, the present disclosure describes systems, devices and procedures that enables a UE, which has a first registration to a mobile network via a first N3IWF, to establish a second registration to the mobile network via a second N3IWF, and to simultaneously use both the first and the second registration.

FIG. 1 depicts a wireless communication system 100 for establishing multiple concurrent registrations with a mobile network, according to embodiments of the disclosure. In one embodiment, the wireless communication system 100 includes at least one remote unit 105, a Radio Access Network ("RAN") 115, and a mobile core network 140. The RAN 115 and the mobile core network 140 form a mobile communication network. The RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 115 is compliant with the 5G system specified in the Third Generation Partnership Project ("3GPP") specifications. For example, the RAN 115 may be a NG-RAN, implementing NR RAT and/or LTE RAT. In another example, the RAN 115 may include non-3GPP RAT (e.g., Wi-Fi® or Institute of Electrical and Electronics Engineers ("IEEE") 802.11-family compliant WLAN). In another implementation, the RAN 115 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) via the mobile core network 140 via the RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network.

In certain embodiments, a non-3GPP access network 130 may be controlled by an operator of the mobile core network 140 and may contain an interworking function that provides direct access to the mobile core network 140. Such a non-3GPP access network deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP access network deployment that is not controlled by an operator (or trusted partner) of the mobile core network 140, does not have direct access to the mobile core network 140, or does not support the certain security features is referred to as a "untrusted" non-3GPP access network. An interworking entity 135 deployed in a trusted non-3GPP access network 130 may be referred to herein as a Trusted Network Gateway Function ("TNGF"). An interworking entity 135 deployed to support interworking with an untrusted non-3GPP access network 130 may be referred to herein as a non-3GPP interworking function ("N3IWF"). Note that the N3IWF is not part of the untrusted non-3GPP access network.

In one embodiment, the mobile core network 140 is a 5G core network (i.e., "5GC") or an Evolved Packet Core ("EPC") networks, which may be coupled to the packet data networks 150 and 160, like the Internet and private data networks, among other data networks. A remote unit 105 may have a subscription or other account with the non-public mobile core network 140. Additionally, the remote unit 105 may have a subscription or other account with the public mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the 5G-RAN 115, a Session Management Function ("SMF") 145, a Policy Control Function ("PCF") 147, an Authentication Server Function ("AUSF") 148, a Unified Data Management function ("UDM") and a User Data Repository ("UDR").

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The AUSF 148 acts as an authentication server and allows the AMF 141 to authenticate the remote unit 105. The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides NF service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), or other NFs defined for the 5GC. In certain embodiments, the mobile core network 140 may include an authentication, authorization, and accounting ("AAA") server.

In various embodiments, the each of the mobile core network 140 supports different types of mobile data connections and different types of network slices, wherein each mobile data connection utilizes a specific network slice. Here, a "network slice" refers to a portion of a core network optimized for a certain traffic type or communication service. A network slice instance may be identified by a single-network slice selection assistance information ("S-NSSAI") while a set of network slices for which the remote unit 105 is authorized to use may be identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for case of illustration, but their support is assumed.

Although specific numbers and types of network functions are depicted in FIG. 1, one of skill in the art will recognize that any number and type of network functions may be included in the mobile core network 140.

While FIG. 1 depicts components of a 5G RAN and a 5G core network, the described embodiments for establishing multiple concurrent registrations with a mobile network apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "access point" is used for the base station but it is replaceable by any other radio access node, e.g., gNB, eNB, Base Station ("BS"), RAN node, etc. Further, the operations are described mainly in the context of 5G NR. However, the proposed solutions/methods are also equally applicable to other mobile communication systems supporting establishment of multiple concurrent registrations with a mobile network.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120)

uses a 3GPP-defined type of wireless communication (e.g., NG-RAN) and the second type of access (e.g., non-3GPP access network 130) uses a non-3GPP-defined type of wireless communication (e.g., WLAN). The RAN 115 refers to any type of 5G access network that can provide access to the mobile core network 140, including the 3GPP access network 120 and the non-3GPP access network 130.

To solve the problem of single-N3IWF registration, described above, the present disclosure proposes solutions that allow a remote unit 105 to establish multiple concurrent registrations with the mobile core network 140 via different interworking entities 135 in order to establish data connections (e.g., PDU sessions) with the data networks 150, 160 via multiple network slices in the mobile core network 140. Here, the different interworking entities 135 are associated with different sets of network slices. In some cases, the different sets of network slices may overlap, i.e., may contain some common network slices.

Figure 2:
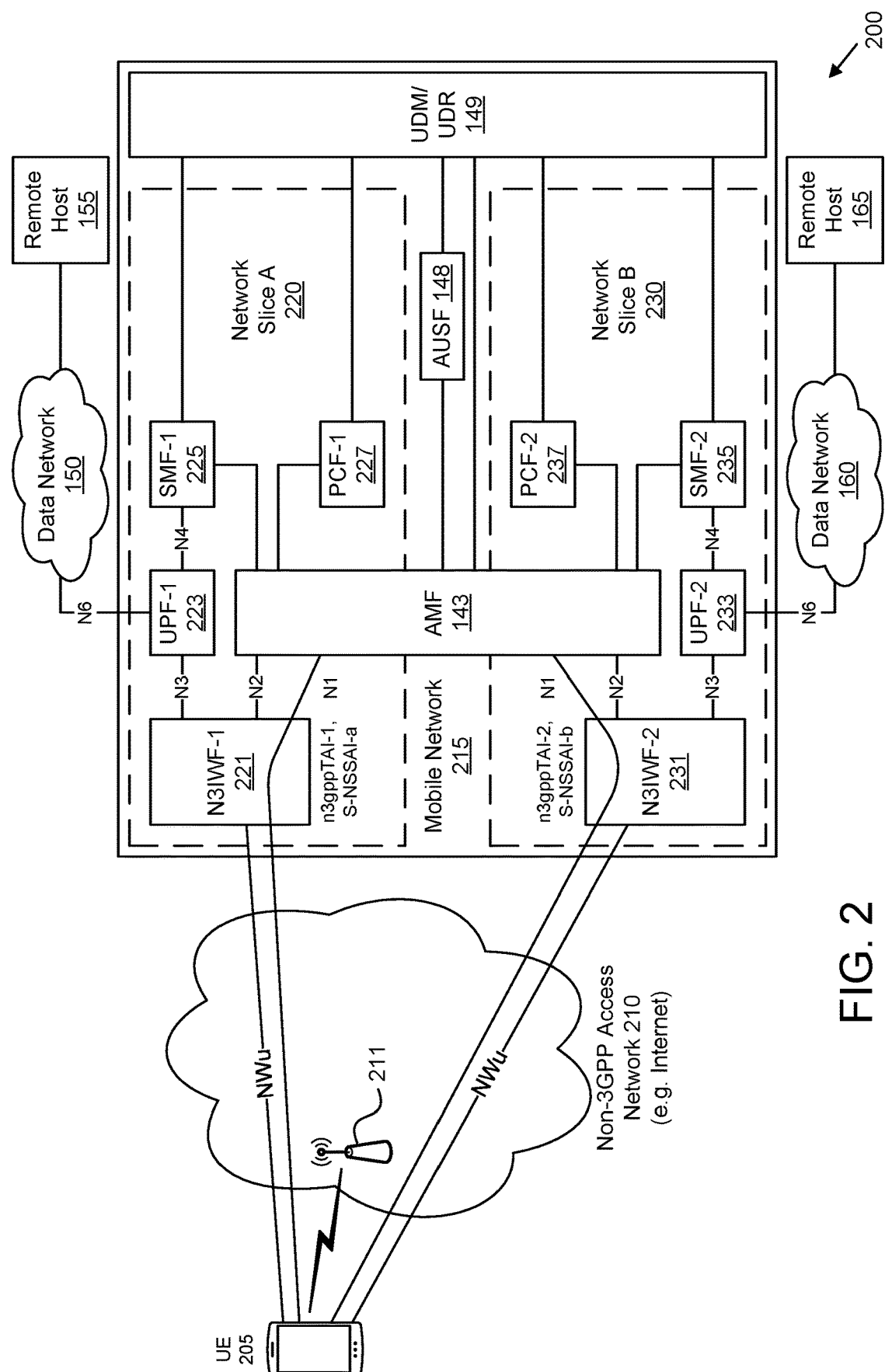
FIG. 2 is a diagram illustrating one embodiment of a network deployment supporting multiple concurrent registrations with a mobile network.

FIG. 2 depicts a network deployment 200 comprising a UE 205, a non-3GPP access network 210 comprising at least one access point 211, and a mobile network 215. Two network slices are shown in the mobile network 215: the Network Slice A 220 (identified by S-NSSAI-a) and the Network Slice B 230 (identified by S-NSSAI-b). Two different N3IWFs are deployed, the first N3IWF ('N3IWF-1') 221 supporting access to Network Slice A 220 (and not to Network Slice B 230) and the second N3IWF ('N3IWF-2') 223 supporting access to Network Slice B 230 (and not to Network Slice A 220). The N3IWFs 221, 231 are deployed in the 5G network, outside the untrusted non-3GPP access network 210.

Note that each network slice has dedicated network functions, such as SMF, PCF, UPF, etc., while there are some network functions shared across the network slices, such as the AMF 143, the AUSF 148 and the UDM/UDR 149. In the depicted embodiment, there is a first UPF ('UPF-1') 223, a first SMF ('SMF-1') 225, and a first PCF ('PCF-1') 227 corresponding to the Network Slice A 220, while there is a second UPF ('UPF-2') 233, a second SMF ('SMF-2') 235, and a second PCF ('PCF-2') 237 corresponding to the Network Slice B 230.

The solution in this disclosure enables the UE 205 to register to the mobile network 215 via the N3IWF-1 221 and establish connectivity to the Data Network 150 via Network Slice A 220 (e.g., for communication with remote host 155) and to concurrently register to the mobile network 215 via N3IWF-2 231 and establish connectivity to the Data Network 160 via Network Slice B 230 (e.g., for communication with remote host 165). Currently, the 3GPP specifications allow the UE 205 to register to a 5G mobile network 215 via a single N3IWF only, hence the need to define simultaneous connectivity to different network slices.

After the first registration via the N3IWF-1 221, an N1 signaling connection is established between the UE 205 and AMF 143, for securely exchanging NAS messages associated with the first registration. Similarly, after the second registration via the N3IWF-2 231, another N1 signaling connection is established between the UE 205 and AMF 143, for securely exchanging NAS messages associated with the second registration. Therefore, the UE 205 maintains a separate N1 signaling connection for each registration via N3IWF.

All N1 signaling connections shown in FIG. 2 terminate at the same AMF 143 because it is assumed that all registrations to the mobile network 215 via different N3IWFs utilize a single AMF 143, e.g., in order to improve efficiency and reduce complexity. While the UE 205 is depicted as using a single non-3GPP access network to connect to the mobile network 215, in other embodiments the UE 205 may connect to the Internet using first access (e.g., WLAN) and second access (e.g., Residential Gateway). Thus, it is possible for the UE 205 to connect to N3IWF-1 221 using a different access network than that used to N3IWF-2 231.

Figure 3A:
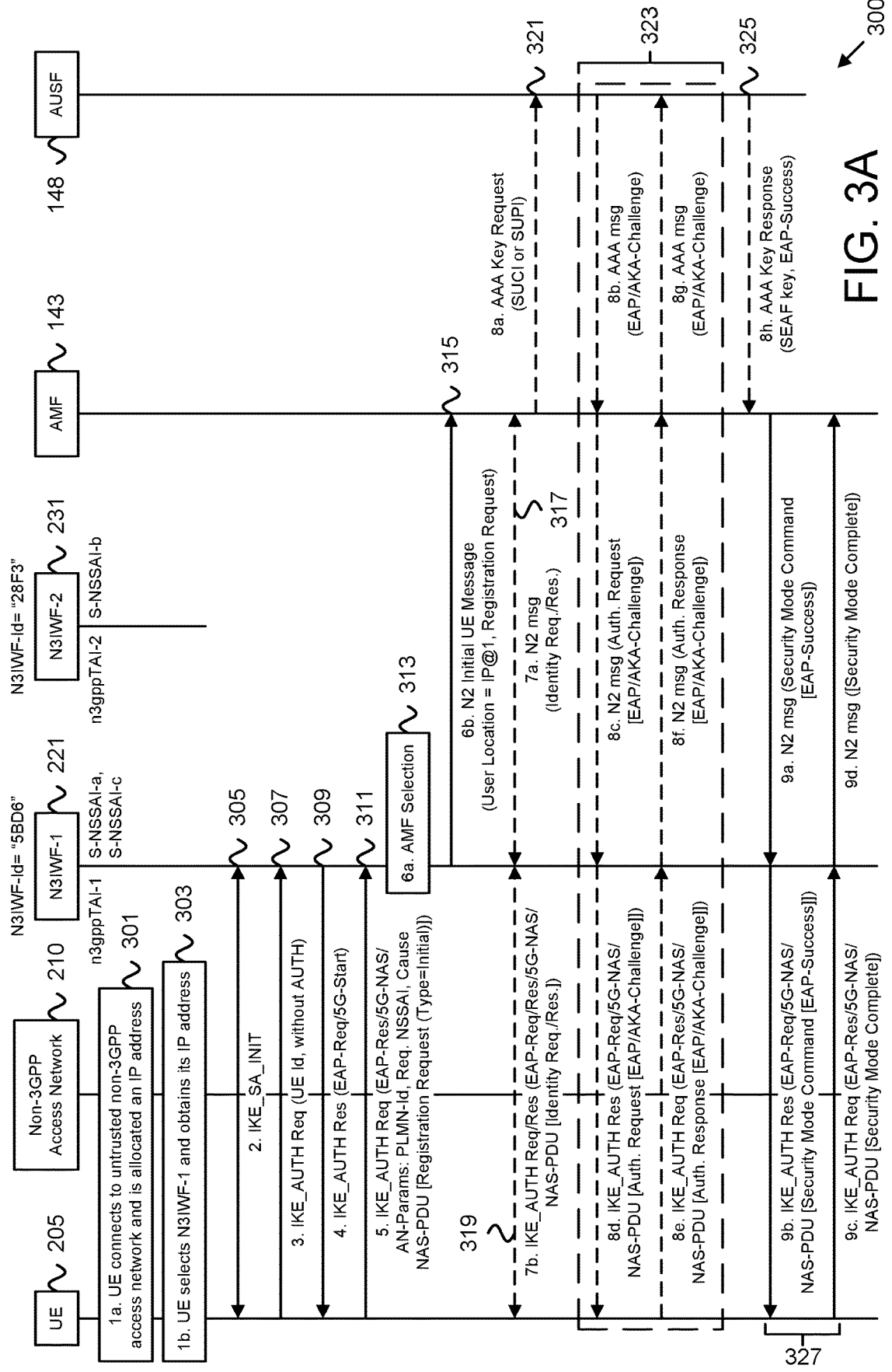
FIG. 3A is a signal flow diagram illustrating one embodiment of a procedure for establishing a first registration with a mobile network.
Figure 3B:
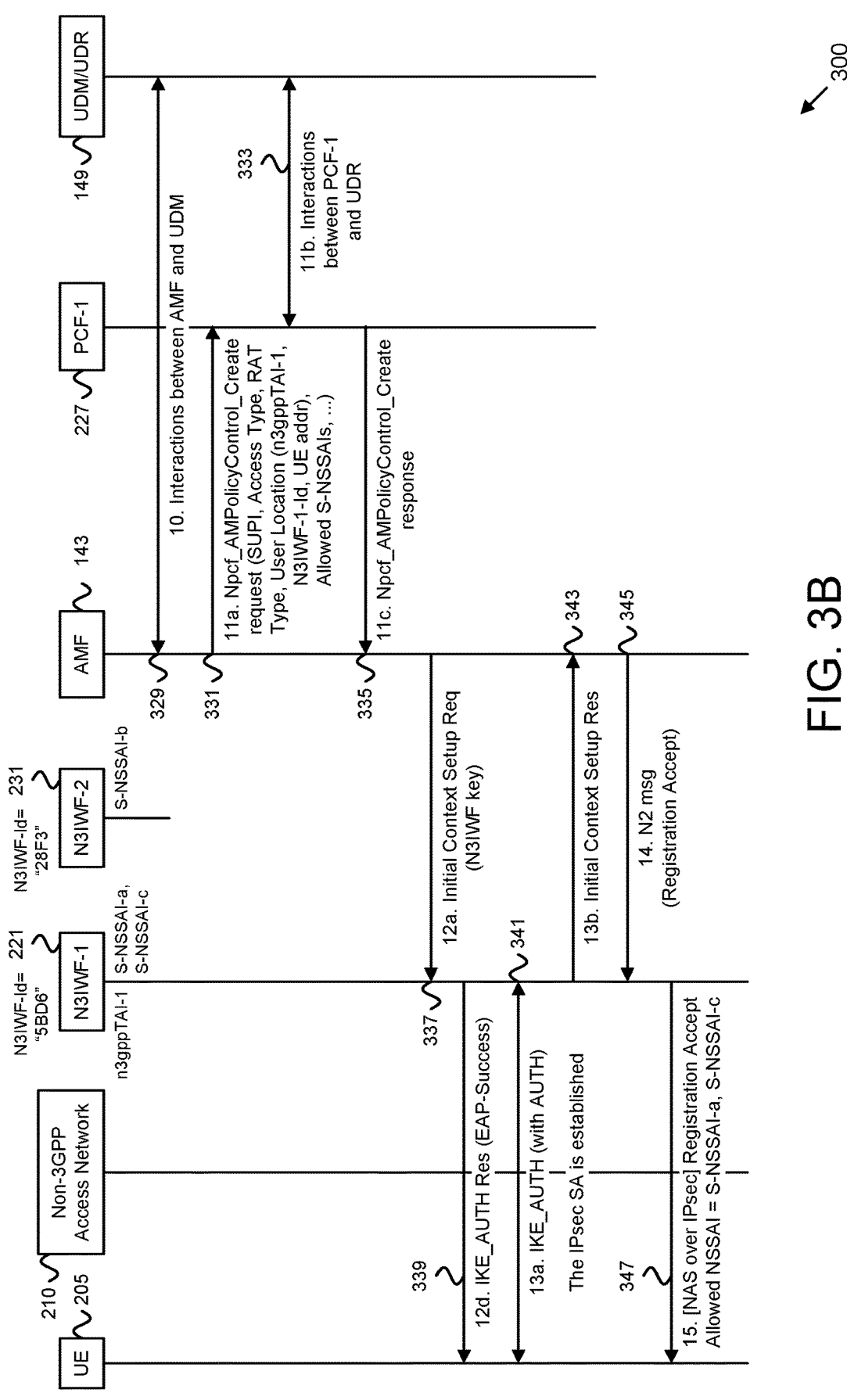
FIG. 3B is a continuation of the procedure depicted in FIG. 3A.

FIGS. 3A-3C depict a procedure 300 for establishing a first registration with a mobile network via an interworking function, according to embodiments of the disclosure. The procedure 300 involves the UE 205, the Non-3GPP Access Network 210, the first N3IWF 221, the second N3IWF 231, the AMF 143, the AUSF 148, the first PCF 227, and the UDM/UDR 149.

The procedure 300 illustrates the steps executed when the UE 205 establishes a first registration to a mobile network (e.g., the mobile network 215) via the first N3IWF 221. Note that the first N3IWF 221 (selected by the UE 205 in step 1*b*) supports a Non-3GPP Tracking Area with identity 'n3gppTAI-1' and the network slices identified by 'S-NS-SAI-a' and 'S-NSSAI-c'. Here, the second N3IWF 223 supports a Non-3GPP Tracking Area with identity 'n3gppTAI-2' and the network slice identified by 'S-NSSAI-b'.

At FIG. 3A, the procedure 300 begins at Step 1*a* where the UE 205 connects to the non-3GPP Access Network 210 (e.g., an untrusted network) and is assigned an IP address, e.g., after using any appropriate authentication procedure (see block 301).

At Step 1*b*, the UE 205 decides to attach to 5GC network and UE selects an N3IWF in a 5G PLMN (see block 303). Here, it is assumed that the UE 205 selects the first N3IWF (i.e., "N3IWF-1") 221. In other embodiments, the UE 205 may select the second N3IWF 231 at this step and proceed to establish the first registration.

At Step 2, the UE 205 proceeds with the establishment of an IPsec Security Association ("SA") with the selected N3IWF-1 221, e.g., by initiating an IKE initial exchange (see signaling 305). Note that after step 2, all subsequent IKE messages are encrypted and integrity protected by using the IKE SA established in this step.

At Step 3, the UE 205 initiates an IKE_AUTH exchange by sending an IKE_AUTH request message (see signaling 307). The AUTH payload is not included in the IKE_AUTH request message, which indicates that the IKE_AUTH exchange is to use EAP signaling (in this case EAP-5G signaling).

At Step 4, the first N3IWF 221 responds with an IKE_AUTH response message, which includes an EAP-Request/5G-Start packet (see signaling 309). The EAP-Request/5G-Start packet informs the UE 205 to initiate an EAP-5G session, i.e., to start sending NAS messages encapsulated within EAP-5G packets.

At Step 5, the UE 205 sends an IKE_AUTH request, which includes an EAP-Response/5G-NAS packet that contains the Access Network parameters (AN parameters) and a Registration Request message (see signaling 311). Note that this Registration Request message include a type set to "Initial."

The AN parameters contain information that is used by the N3IWF for selecting an AMF in the 5G core network. This information includes, e.g., the GUAMI, the Selected PLMN ID (or PLMN ID and NID), the Requested NSSAI and an Establishment cause. The Establishment cause provides the reason for requesting a signaling connection with 5GC. Whether and how the UE includes the Requested NSSAI as part of the AN parameters is dependent on the value of the Access Stratum Connection Establishment NSSAI Inclusion Mode parameter.

At Step 6*a*, the first N3IWF 221 selects the AMF 143 based on the received AN parameters and local policy (see block 313).

At Step 6*b*, the first N3IWF 221 forwards the Registration Request received from the UE 205 to the selected AMF 143, e.g., within an N2 message (see signaling 315). This message contains N2 parameters that include the Selected PLMN ID and the Establishment cause.

At Step 7, the AMF 143 may decide to request the SUCI of the UE 205, e.g., by sending a NAS Identity Request message to UE 205 (see signaling 317-319). Note that this NAS message and all subsequent NAS messages sent to UE 205 are encapsulated within EAP/5G-NAS packets.

At Step 8*a*, the AMF 143 may decide to authenticate the UE 205, e.g., by invoking an AUSF (here, the AUSF 148; see signaling 321). Note that the AMF 143 may select the AUSF 148 based on SUPI or SUCI of the UE 205.

At Steps 8*b*-8*g*, the AUSF 148 executes the authentication of the UE 205 (see procedure 323). In some embodiments, the AUSF 148 selects a UDM and gets the authentication data from the UDM. Note that the authentication packets are encapsulated within NAS authentication messages and the NAS authentication messages are encapsulated within EAP/5G-NAS packets.

At Step 8*h*, after the successful authentication the AUSF 148 sends a Key Response message to the AMF 143 (see signaling 325). The Key Response message includes an anchor key (e.g., SEAF key) which is used by the AMF 143 to derive NAS security keys and a security key for the first N3IWF 221 (referred to as "N3IWF key"). Note that the UE 205 also derives the anchor key (e.g., SEAF key) and from that key it derives the NAS security keys and the N3IWF key (not depicted). The N3IWF key is used by the UE 205 and the first N3IWF 221 for establishing the IPsec Security Association (in step 11).

At Step 9*a*-9*d*, the AMF 143 sends a NAS Security Mode Command to the UE 205 in order to activate NAS security (see signaling 327). If an EAP-AKA' authentication was successfully executed in step 8, the AMF 143 encapsulates the EAP-Success received from AUSF 148 within the NAS Security Mode Command message. The first N3IWF 221 forwards the NAS Security Mode Command message to the UE 205 within an EAP/5G-NAS packet.

The UE 205 completes the EAP-AKA' authentication (if initiated in step 8), creates a NAS security context and the N3IWF key and sends the NAS Security Mode Complete message within an EAP/5G-NAS packet. The first N3IWF 221 relays the NAS Security Mode Complete message to the AMF 143.

Continuing on FIG. 3B, at Step 10 the AMF 143 retrieves subscription data from the UDM for the UE 205 (see signaling 329).

At Step 11, the AMF 143 selects a PCF (here, the first PCF 227) and retrieves one or more slice-specific policy rules. Specifically, at Step 11*a* the AMF 143 initiates the regular AM policy association establishment procedure with the first PCF 227, e.g., by invoking the Npcf_AMPolicy Control_Create service operation (see signaling 331). As depicted, the request includes UE information, including: SUPI, Access Type, RAT Type, User Location (n3gppTAI-1, N3IWF-1-Id, UE address), Allowed S-NSSAIs, etc.

At Step 11*b*, the first PCF 227 retrieves relevant subscription data from the UDR, e.g., based on the UE information (see signaling 333). At Step 11*c*, the first PCF 227 provides to the AMF 143 access and mobility policy pertaining to the non-3GPP tracking area of the first N3IWF 221 (i.e., n3gppTAI-1) and to the identity of the first N3IWF 221 (i.e., containing first policy rules applicable to the first registration) (see signaling 335).

At Step 12a, the AMF 143 sends an NGAP Initial Context Setup Request message that includes the N3IWF key (see signaling 337).

At Step 12b, triggered by the Initial Context Setup Request, the first N3IWF 221 sends an EAP-Success packet to the UE 205, which completes the EAP-5G session (see signaling 339). No further EAP-5G packets are exchanged.

At Step 33a, IKE_AUTH Request/Response messages are exchanged between the UE 205 and the first N3IWF 221 that include the AUTH payload, which is derived based on the common N3IWF key created in the UE 205 and in the AMF 143 (see signaling 341). The AUTH payload is used to mutually authenticate the UE 205 and the first N3IWF 221.

After the successful mutual authentication, a secure IPsec SA is created between the UE 205 and the second N3IWF 231. This IPsec SA may be referred to as the "signaling IPsec SA". The UE establishes a TCP connection with the first N3IWF 221, which completes the establishment of the NWu connection between the UE 205 and the first N3IWF 221.

At Step 13b, after the establishment of the signaling IPsec SA, the first N3IWF 221 notifies the AMF 143 that the UE context (including AN security) was created, e.g., by sending a NGAP Initial Context Setup Response (see signaling 343). All subsequent NAS messages exchanged between the UE 205 and the first N3IWF 221 are to be sent via the signaling IPsec SA and carried over TCP/IP.

At Step 14, the AMF 143 sends a DL NAS Transport message (shown as N2 msg) to the first N3IWF 221 containing a Registration Accept message for the UE 205 (see signaling 345). The N2 Message includes the Allowed NSSAI for the UE 205.

At Step 15, the first N3IWF 221 forwards the NAS Registration Accept message to the UE 205 (e.g., via the established signaling IPsec SA), the Registration Accept message containing the Allowed NSSAI (see signaling 347). Here, it is assumed that the Allowed NSSAI includes the S-NSSAI-a and S-NSSAI-c.

Note that the Registration Accept message received by the UE 205 (in step 15), contains the S-NSSAIs (in this case, S-NSSAI-a and S-NSSAI-c) allowed to be used by the UE 205 with the registration via the first N3IWF 221. Subsequently, the UE 205 may establish PDU Sessions (aka data connections) by using these allowed S-NSSAIs.

Figure 4A:
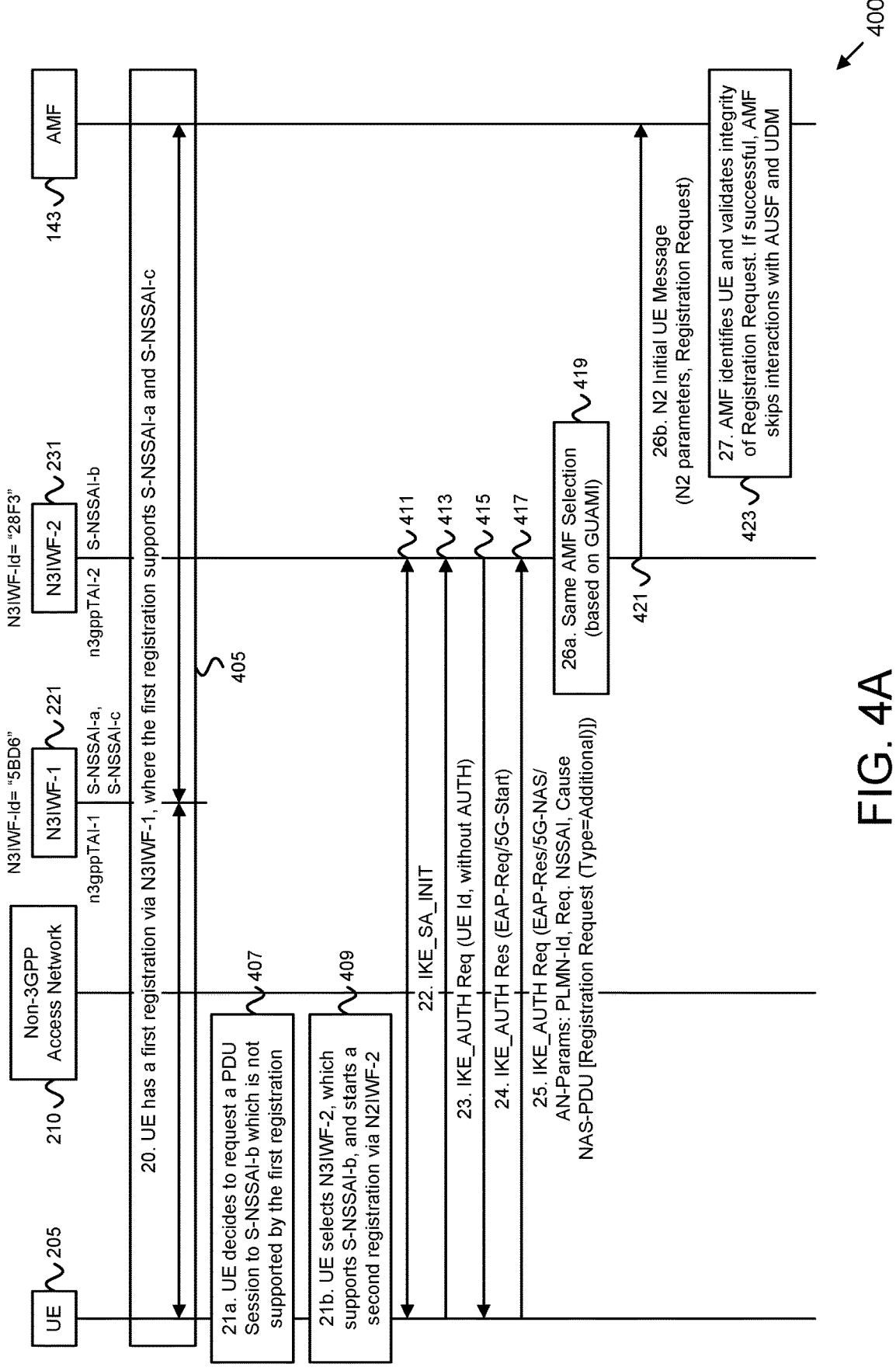
FIG. 4A is a signal flow diagram illustrating one embodiment of a procedure for establishing a second, concurrent registration with a mobile network.
Figure 4B:
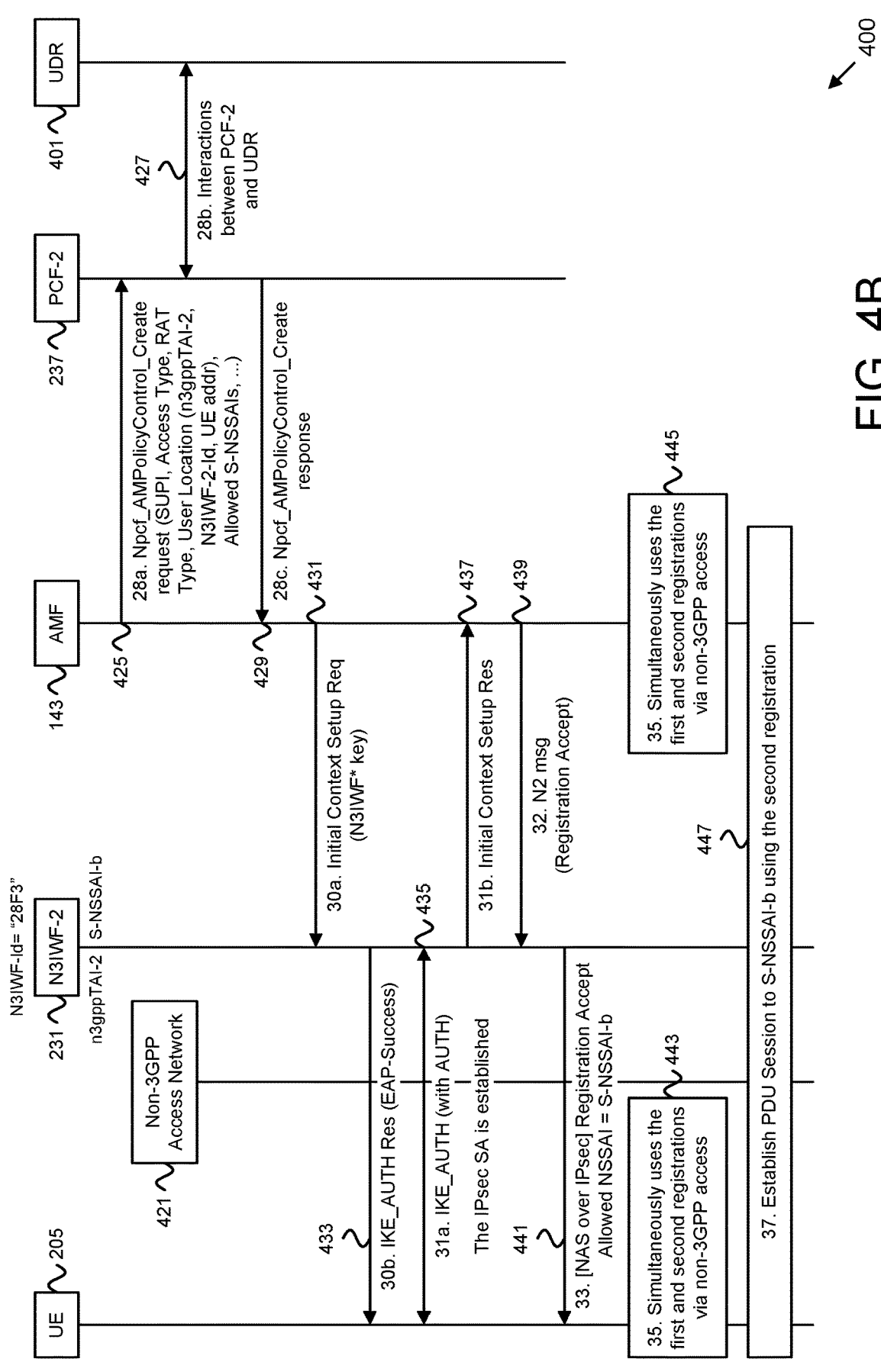
FIG. 4B is a continuation of the procedure depicted in FIG. 4A.

FIGS. 4A-4B depict a procedure 400 for establishing a second, concurrent registration with a mobile network via an interworking function, according to embodiments of the disclosure. The procedure 400 involves the UE 205, the Non-3GPP Access Network 210, the first N3IWF 221, the second N3IWF 231, the AMF 143, the second PCF 237, and a UDR 401 (e.g., a UDR portion of the UDM/UDR 149). Note that the procedure 400 in some ways is a simplified registration because it is not an initial registration. Thus, interactions between the AMF 143 and the AUSF and between the AMF 143 and the UDM are not needed.

The procedure 400 enables a UE 205, which has a first registration to a mobile network (e.g., the mobile network 215) via a first N3IWF 221 (e.g., established with the procedure shown in FIGS. 3A-3B), to establish a second registration to the same mobile network via a second N3IWF 231, and to simultaneously use both the first and the second registration. This capability is not currently supported by 3GPP specifications. Note that the first N3IWF 221 supports a Non-3GPP Tracking Area with identity 'n3gppTAI-1' and the network slices identified by 'S-NSSAI-a' and 'S-NSSAI-c', while the second N3IWF 223 supports a Non-3GPP Tracking Area with identity 'n3gppTAI-2' and the network slice identified by 'S-NSSAI-b'.

At FIG. 4A, the procedure 400 begins at Step 20 where the UE has established a first registration to the 5G network via the first N3IWF 221 (e.g., as shown in FIGS. 3A-3B) and is allowed to establish data connectivity using either S-NSSAI-a or S-NSSAI-c (see block 405). Effectively, this means that the UE 205 is allowed to connect to a data network via a 5G network slice identified by S-NSSAI-a, or via a 5G network slice identified by S-NSSAI-c.

At Step 21, the UE 205 determines that data connectivity using S-NSSAI-b is required (see block 407). This may be determined, e.g., after applying the URSP rules in the UE 205. Because data connectivity using S-NSSAI-b is not allowed with the first registration, the UE 205 selects a second N3IWF (N3IWF-2) 231 that supports S-NSSAI-b and starts a second registration via this N3IWF.

At Step 22, the UE 205 starts the second registration by first initiating an IKE initial exchange with the second N3IWF 231, e.g., according to RFC 7296 (see signaling 411).

At Step 23, the UE 205 initiates an IKE_AUTH exchange by sending an IKE_AUTH request message (see signaling 413). The AUTH payload is not included in this IKE_AUTH request message, which indicates that the IKE_AUTH exchange is to use EAP signaling.

At Step 24, the second N3IWF 231 responds with an IKE_AUTH response message (see signaling 415). The IKE_AUTH response message includes an EAP-Request/5G-Start packet indicating to the UE 205 that an EAP-5G session starts and the UE 205 can start sending NAS messages encapsulated within EAP-5G packets.

At Step 25, the UE 205 sends an IKE_AUTH request to the second N3IWF 231 (see signaling 417). Here, the IKE_AUTH request message includes an EAP-Response/5G-NAS packet that contains Access Network parameters (AN-Params) and a Registration Request message. The AN-Params contains the GUAMI of the AMF 143, the Selected PLMN identity, an Establishment cause and a Requested NSSAI, which, in this case, contains S-NNSAI-b. The Establishment cause provides the reason for requesting a signaling connection with 5GC.

The GUAMI of the AMF 143 is part of the 5G-GUTI identifier received by the UE 205 during the first registration. Because the UE 205 has already established a NAS security context with the AMF 143, the Registration Request message is sent with integrity protection. This integrity protection applies the common integrity keys and algorithms that were negotiated between the UE 205 and the AMF 143 during the establishment of the first registration.

Additionally, the Registration Request message contains a new registration type (e.g., type=Additional), which indicates to the AMF 143 that this registration should not replace an existing registration, such as the first registration. Indeed, this registration should be established in parallel (or in addition) to an existing registration via another N3IWF.

At Step 26a, based on the received GUAMI, the second N3IWF 231 selects the same AMF 143 as the one that was selected in the first registration procedure (see block 419).

At Step 26b, the second N3IWF 231 forwards the Registration Request received from the UE 205 to the selected AMF 143 within an N2 Initial UE Message (see signaling 421). This message contains N2 parameters that include the Selected PLMN ID and the Establishment cause.

At Step 27, the AMF 143 identifies the UE 205 (e.g., based on the 5G-GUTI identity included in the Registration Request message) and validates the integrity of the Registration Request message (see block 423). The AMF 143 validates the message by using the existing NAS security context for this UE 205. If the integrity validation is successful, then the AMF 143 accepts the Registration Request message and determines from the registration type (e.g., type=Additional) that this message requests a new (additional) registration via a N3IWF (e.g., the second N3IWF 231), which should be processed without impacting or replacing another registration of the UE via a different N3IWF (e.g., the first N3IWF 221).

Since the integrity validation is successful, the AMF 143 also skips the authentication procedure (i.e., does not interact with the AUSF 148) and skips the interactions with the UDM. The interactions with the UDM are not needed since, during the first registration, the AMF 143 has already retrieved from UDM the subscription data for this UE 205 and has subscribed with UDM to be notified when the UE 205 subscription data changes.

Continuing on FIG. 4B, at Step 28 the AMF 143 selects a second PCF 237 for this UE registration, which is typically different from the first PCF 227 because it is associated with a different network slice (i.e., S-NSSAI-b). The AMF 143 initiates the regular AM policy association establishment procedure with the second PCF 237 (see signaling 425).

At Step 28c, as a result, the second PCF 237 provides to the AMF 143 access and mobility policy pertaining to the non-3GPP tracking area of the second N3IWF 231 (i.e., n3gppTAI-2) and to the identity of the second N3IWF 231 (i.e., containing second policy rules applicable to the second registration) (see signaling 427).

At Step 30a, the AMF 143 sends an Initial Context Setup Request to the second N3IWF 231 in order to setup a secure connection with the UE 205 (see signaling 435). This message includes a new N3IWF key (called N3IWF*), which is created with a Key Derivation Function ("KDF") using as an input the N3IWF key that was created during the first registration, e.g., N3IWF* key=KDF(N3IWF key). The same N3IWF* key is derived in the UE 205. Note that the N3IWF key (i.e., '$K_{N3IWF}$') is a key derived by ME of the UE 205 and the AMF 143 from the AMF key (i.e., $K_{AMF}$) for the non-3GPP access. $K_{N3IWF}$ is not forwarded between N3IWFs.

If the UE needs some information to derive the N3IWF* key, then the second N3IWF 231 may provide this information, e.g., by sending an EAP-Request/5G-Notification message to UE, after step 30a. In this case, the UE responds with an EAP-Response/5G-Notification message.

At Step 30b, the second N3IWF 231 in turn sends an EAP-Success packet to the UE 205 inside an IKE_AUTH Response, which concludes the EAP-5G session initiated in step 24 (see signaling 437).

At Step 31a, IKE_AUTH Request/Response messages are exchanged between the UE 205 and the second N3IWF 231 that include the AUTH payload, which is derived based on the common N3IWF* key created in the UE 205 and in the AMF 143. The AUTH payload is used to mutually authenticate the UE 205 and the second N3IWF 231.

After the successful mutual authentication, a secure IPsec SA is created between the UE 205 and the second N3IWF 231. The UE establishes a TCP connection with the second N3IWF 231 (as specified in TS 23.502), which completes the establishment of the NWu connection between the UE 205 and the second N3IWF 231.

At Step 31b, establishment of the NWu connection triggers the second N3IWF 231 to send an Initial Context Setup Response message to the AMF 143, indicating that a secure connection with the UE 205 (i.e., as requested in step 30a) has been established.

At Step 32, the AMF 143 sends a DL NAS Transport message (shown as N2 msg) to the second N3IWF 231 containing a Registration Accept message for the UE 205 (see signaling 439). The N2 Message includes a second Allowed NSSAI for the UE 205. Here, it is assumed that the second Allowed NSSAI includes the S-NSSAI-b.

At Step 33, the second N3IWF 231 forwards the Registration Accept message to the UE 205 inside the established NWu connection. The Registration Accept message contains the S-NSSAI-b, which indicates that the UE 205 is registered to S-NSSAI-b and is allowed to establish data connections using S-NSSAI-b.

At Step 35, the UE 205 and the AMF 143 maintain two different registrations via non-3GPP access: the first registration via the first N3IWF 221 and the second registration via the second N3IWF 231. Each registration is associated with a different set of S-NSSAIs.

At Step 37, at this point, the UE 205 may establish PDU Sessions (aka data connections) by using S-NSSAI-b via the second N3IWF 231 and may, simultaneously, establish PDU Sessions by using S-NSSAI-a or S-NSSAI-c via the first N3IWF 221.

Figure 5:
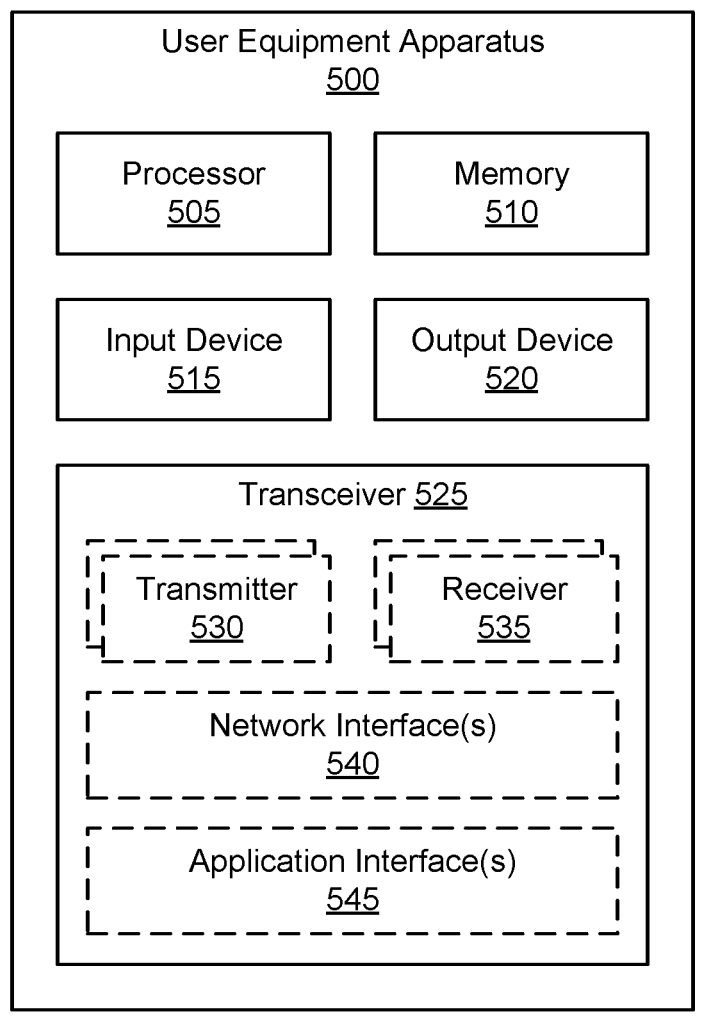
FIG. 5 is a block diagram illustrating one embodiment of a user equipment apparatus that may be used for establishing multiple concurrent registrations with a mobile network.

FIG. 5 depicts a user equipment apparatus 500 that may be used for establishing multiple concurrent registrations with a mobile network, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panel supporting one or more beams. Additionally, the transceiver 525 may support at least one network interface 540 and/or application interface 545. The application interface(s) 545 may support one or more APIs. The network interface(s) 540 may support 3GPP reference points, such as NWu, Uu, N1, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 controls the user equipment apparatus 500 to implement the above described UE behaviors. For example, using the transceiver 525 the processor 505 may send a first registration request message to the access management function via a first interworking function (e.g., N3IWF-1) and receive a first registration response message from the access management function via the first interworking function, where the first interworking function supports a first set of network slices. Here, the first registration request message contains a first registration type (e.g., type=Initial) and the first registration response message (e.g., a registration accept message) contains a first allowed NSSAI.

The first registration response message establishes a first registration between the second apparatus and the mobile communication network via the first interworking function. Here, the first registration enables the second apparatus to access a first subset of network slices identified by the first allowed NSSAI, where the first subset includes one or more slice identifiers (i.e., S-NSSAIs) from the first set of network slices supported by the first interworking function.

Using the transceiver 525, the processor 505 sends a second registration request message to the access management function via a second interworking function (e.g., N3IWF-2) and receives a second registration response message from the access management function via the second interworking function, where the second interworking function supports a second set of network slices. Here, the second registration request message contains a second registration type (e.g., type=Additional) different from the first registration type, and the second registration response message (e.g., a registration accept message) contains a second allowed NSSAI.

The second registration response message establishes a second registration between the apparatus and the mobile communication network via the second interworking function, where the second registration is in addition to the first registration (i.e., is established without replacing or otherwise impacting the first registration). Here, the second registration enables the second apparatus to access a second subset of network slices identified by the second allowed NSSAI, where the second subset includes one or more slice identifiers (i.e., S-NSSAIs) from the second set of network slices supported by the second interworking function.

In some embodiments, the processor 505 sends the second registration request message in response to determining that access to a particular network slice is required, where the particular network slice is not included in the first subset of network slices (i.e., not included in the first allowed NSSAI). In some embodiments, the second registration request message contains a requested NSSAI (e.g., including a S-NSSAI of the particular network slice). In certain embodiments, the second set of network slices is different from the first set of network slices. In some cases, the first and the second sets of network slices may overlap, i.e., may contain some common network slices.

In some embodiments, the second registration request message is sent with integrity protection using an integrity key and algorithm negotiated during establishment of the first registration. In some embodiments, the processor 505 derives a first interworking key (e.g., N3IWF key) during the establishment of the first registration, wherein the processor 505 derives a second interworking key (e.g., N3IWF* key) based on the first interworking key. In certain embodiments, the processor 505 further receives a notification message after sending the second registration request message and prior to receiving the second registration response message, said notification message including additional information used to derive the second interworking key.

In some embodiments, the processor 505 establishes a first data connection using the first registration and concurrently establishes a second data connection using the second registration, where the first and second data connections use different network slices. Here, the first data connection uses a network slice from the first subset of network slices (i.e., contained in the first allowed NSSAI) and the second data connection uses a network slice from the second subset of network slices (i.e., contained in the second allowed NSSAI). In certain embodiments, the first and second data connections are established via the non-3GPP access network. In certain embodiments, the first and second interworking functions each include a N3IWF.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to establishing multiple concurrent registrations with a mobile network. For example, the memory 510 may store various parameters, panel/beam configurations, resource assignments, policies, and the like as described above. In certain embodiments, the memory 510 also stores program code and related data, such as an operating system or other controller algorithms operating on the user equipment apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
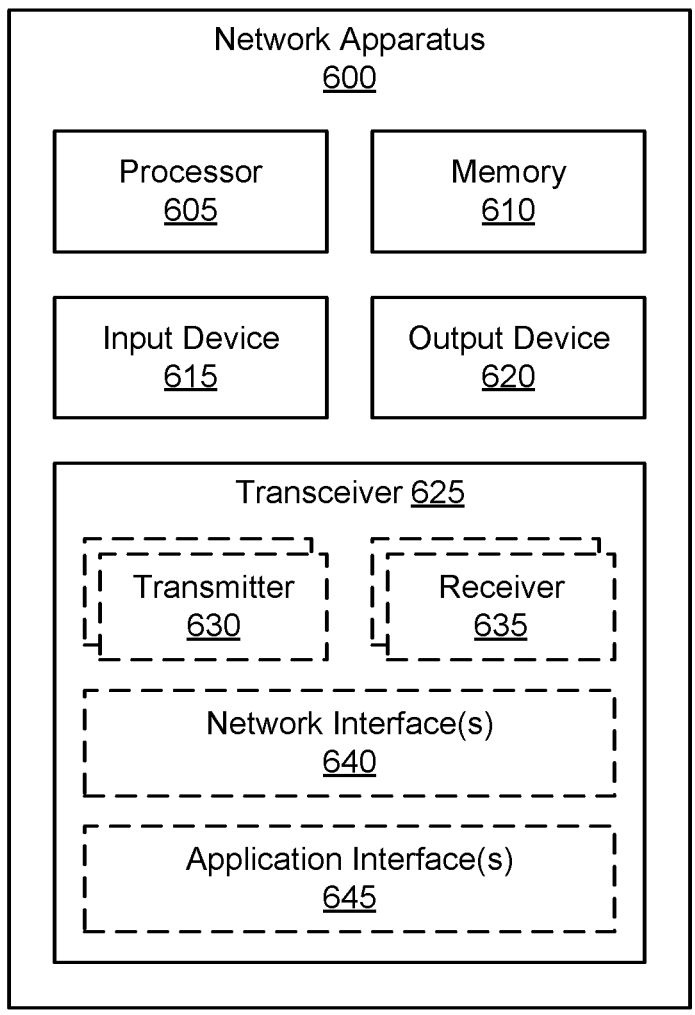
FIG. 6 is a block diagram illustrating one embodiment of a network apparatus that may be used for establishing multiple concurrent registrations with a mobile network.

FIG. 6 depicts a network apparatus 600 that may be used for establishing multiple concurrent registrations with a mobile network, according to embodiments of the disclosure. In one embodiment, network apparatus 600 may be one implementation of an access management function in a mobile communication network, such as the AMF 143, described above. Furthermore, the network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as NWu, Uu, N1, N2, N3, N4, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the network apparatus 600 to implement the above described AMF behaviors. For example, via the network interface 640 the processor 605 may receive a first registration request message from a UE (i.e., remote unit) via a first interworking function (e.g., N3IWF-1) and send a first registration response message to the UE via the first interworking function, where the first interworking function supports a first set of network slices. Here, the first registration request message contains a first registration type (e.g., type=Initial) and the first registration response message (e.g., a registration accept message) contains a first allowed NSSAI.

Additionally, the first registration response message establishes a first registration between the UE and the mobile communication network via the first interworking function. Here, the first registration enables access (i.e., by the UE) to a first subset of network slices identified by the first allowed NSSAI, where the first subset includes one or more slice identifiers (i.e., S-NSSAIs) from the first set of network slices supported by the first interworking function.

Via the network interface 640 the processor 605 receives a second registration request message from the UE via a second interworking function (e.g., N3IWF-2) and sends a second registration response message to the UE via the second interworking function, where the second interworking function supports a second set of network slices. Here, the second registration request message contains a second registration type (e.g., type=Additional), different from the first registration type, and the second registration response message (e.g., a registration accept message) contains a second allowed NSSAI.

Additionally, the second registration response message establishes a second registration between the UE and the mobile communication network via the second interworking function. Importantly, the second registration is in addition to the first registration (i.e., is established without replacing or otherwise impacting the first registration). Here, the second registration enables access (i.e., by the UE) to a second subset of network slices identified by the second allowed NSSAI, where the second subset includes one or more slice identifiers (i.e., S-NSSAIs) from the second set of network slices supported by the second interworking function.

In some embodiments, the second registration is received in response to the UE determining that access to a particular network slice is required, but where the particular network slice is not included in the first subset of network slices (i.e., not included in the first allowed NSSAI). In some embodiments, the second registration request message contains a requested NSSAI (e.g., including a S-NSSAI of the particular network slice). In such embodiments, the processor 605 determines the second allowed NSSAI using the requested NSSAI and the second set of network slices. In certain embodiments, the second set of network slices is different from the first set of network slices. In some cases, the first and the second sets of network slices may overlap, i.e., may contain some common network slices.

In some embodiments, the second registration request message is sent with integrity protection. In such embodiments, the processor 605 validates the integrity of the second registration request message and skips authenticating the UE in response to successfully validating the integrity of the second registration request message. In certain embodiments, the processor 605 establishes a NAS security context for the UE in response to establishing the first registration. In such embodiments, the processor 605 uses the NAS security context to validate the second registration request message.

In some embodiments, the processor 605 retrieves (i.e., sends a request and receives a response) subscription data of the UE in response to receiving the first registration request message and prior to sending the first registration response message. In such embodiments, the processor 605 skips retrieving the subscription data of the UE in response to successfully validating the integrity of the second registration request message.

In some embodiments, the processor 605 retrieves (i.e., sends a request and receives a response) first policy rules from a first PCF. Moreover, the processor 605 selects a second PCF in response to receiving the second registration request message and retrieves second policy rules from the second PCF. Here, the first policy rules are applicable to the first registration, while the second policy rules are applicable to the second registration.

In some embodiments, the processor 605 derives a first interworking key (e.g., N3IWF key) during the establishment of the first registration. In such embodiments, the processor 605 derives a second interworking key (e.g., N3IWF* key) based on the first interworking key and provides the second interworking key to the second interworking function. In certain embodiments, the processor 605 applies the first interworking key to establish a secure data connection between the UE and the first interworking function, while the second interworking key is applied to establish a secure data connection between the UE and the second interworking function.

In some embodiments, the network apparatus 600 is a gateway function and/or interworking function, such as the N3IWF-1 221 and/or N3IWF-2 223, described above. In such embodiments, the processor 605 may control the network interface 640 to send and receive messages between a UE and AMF, as described above.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to establishing multiple concurrent registrations with a mobile network. For example, the memory 610 may store parameters, configurations, resource assignments, policies, and the like, as described above. In certain embodiments, the memory 610 also stores program code and related data, such as an operating system or other controller algorithms operating on the network apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the NPN, PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

FIG. 7 depicts one embodiment of a method 700 for establishing multiple concurrent registrations with a mobile network, according to embodiments of the disclosure. In various embodiments, the method 700 is performed by an access management function in a mobile communication network, such as the AMF 143 and/or the network apparatus 600, described above. In some embodiments, the method 700 is performed by a processor, such as a microcontroller, a microprocessor, a CPU, a GPU, an auxiliary processing unit, a FPGA, or the like.

The method 700 begins and receives 705 a first registration request message from a UE via a first interworking function (e.g., N3IWF-1), the first registration request message containing a first registration type (e.g., type=Initial). Here, the first interworking function supports a first set of network slices. The method 700 includes sending 710 a first registration response message to the UE via the first interworking function, the first registration response message (e.g., a registration accept message) containing a first allowed NSSAI.

The first registration response message establishes a first registration between the UE and the mobile communication network via the first N3IWF. As described above, the first registration enables access (i.e., by the UE) to a first subset of network slices identified by the first allowed NSSAI, where the first subset includes one or more slice identifiers (i.e., S-NSSAIs) from the first set of network slices supported by the first interworking function.

The method 700 includes receiving 715 a second registration request message from the UE via a second interworking function (e.g., N3IWF-2). Here, the second registration request message contains a second registration type (e.g., type=Additional) different from the first registration type, where the second interworking function supports a second set of network slices. The method 700 includes sending 720 a second registration response message to the UE via the second interworking function, the second registration response message (e.g., a registration accept message) containing a second allowed NSSAI.

The second registration response message establishes a second registration between the UE and the mobile communication network via the second interworking function, where the second registration is in addition to the first registration (i.e., is established without replacing or otherwise impacting the first registration). As described above, the second registration enables access (i.e., by the UE) to a second subset of network slices identified by the second allowed NSSAI, where the second subset includes one or more slices identifiers (i.e., S-NSSAIs) from the second set of network slices supported by the second interworking function. The method 700 ends.

FIG. 8 depicts one embodiment of a method 800 for establishing multiple concurrent registrations with a mobile network, according to embodiments of the disclosure. In various embodiments, the method 800 is performed by a user equipment device in a mobile communication network, such as the remote unit 105, the UE 205, and/or the user equipment apparatus 500, described above. In some embodiments, the method 800 is performed by a processor, such as a microcontroller, a microprocessor, a CPU, a GPU, an auxiliary processing unit, a FPGA, or the like.

The method 800 begins and sends 805 a first registration request message to an access management function in a mobile communication network via a first interworking function in the mobile communication network (i.e., N3IWF-1), where the first interworking function supports a first set of network slices and the first registration request message contains a first registration type (e.g., type=Initial). The method 800 includes receiving 810 a first registration response message from the access management function via the first interworking function, the first registration response message (e.g., a registration accept message) containing a first allowed NSSAI.

The first registration response message establishes a first registration between the user equipment device and the mobile communication network via the first interworking function. Here, the first registration enables the user equipment device to access a first subset of network slices identified by the first allowed NSSAI, where the first subset includes one or more slice identifiers (i.e., S-NSSAIs) from the first set of network slices supported by the first interworking function.

The method 800 further includes sending 815 a second registration request message to the access management function via a second interworking function (e.g., N3IWF-2), where the second interworking function supports a second set of network slices and the second registration request message containing a second registration type (e.g., type=Additional) different from the first registration type. The method 800 includes receiving 820 a second registration response message (e.g., a registration accept message) from the access management function via the second interworking function, the second registration response message containing a second allowed NSSAI.

The second registration response message establishes a second registration between the user equipment device and the mobile communication network via the second interworking function, where the second registration is in addition to the first registration (i.e., is established without replacing or otherwise impacting the first registration). Here, the second registration enables the user equipment device to access a second subset of network slices identified by the second allowed NSSAI, where the second subset includes one or more slice identifiers (i.e., S-NSSAIs) from the second set of network slices supported by the second interworking function. The method 800 ends.

Disclosed herein is a first apparatus for establishing multiple concurrent registrations with a mobile network, according to embodiments of the disclosure. The first apparatus may be implemented by an access management function in a mobile communication network, such as the AMF

143 and/or the network apparatus 600, described above. The first apparatus includes a processor and a network interface that communicates with a remote unit (i.e., UE) via at least one interworking function (i.e., N3IWF) and that communicates with at least one network function in the mobile communication network, said mobile communication network supporting a plurality of network slices.

The processor receives a first registration request message from a remote unit via a first interworking function (e.g., N3IWF-1) and sends a first registration accept message to the remote unit via the first interworking function, where the first interworking function supports a first set of network slices. Here, the first registration request message contains a first registration type (e.g., type=Initial) and the first registration accept message contains a first allowed network slice selection assistance information ("NSSAI").

The first registration accept message establishes a first registration between the remote unit and the mobile communication network via the first interworking function. Here, the first registration enables access (i.e., by the remote unit) to a first subset of network slices identified by the first allowed NSSAI, where the first subset includes one or more slice identifiers (i.e., S-NSSAIs) from the first set of network slices supported by the first interworking function.

Further, the processor receives a second registration request message from the remote unit via a second interworking function (e.g., N3IWF-2) and sends a second registration accept message to the remote unit via the second interworking function, where the second interworking function supports a second set of network slices. Here, the second registration request message contains a second registration type (e.g., type=Additional), different from the first registration type, and the second registration accept message contains a second allowed NSSAI.

The second registration accept message establishes a second registration between the remote unit and the mobile communication network via the second interworking function, where the second registration is in addition to the first registration (i.e., is established without replacing or otherwise impacting the first registration). Here, the second registration enables access (i.e., by the remote unit) to a second subset of network slices identified by the second allowed NSSAI, where the second subset includes one or more slice identifiers (i.e., S-NSSAIs) from the second set of network slices supported by the second interworking function.

In some embodiments, the second registration is received in response to the remote unit determining that access to a particular network slice is required, but where the particular network slice is not included in the first subset of network slices (i.e., not included in the first allowed NSSAI). In some embodiments, the second registration request message contains a requested NSSAI (e.g., including a S-NSSAI of the particular network slice). In such embodiments, the processor determines the second allowed NSSAI using the requested NSSAI and the second set of network slices. In certain embodiments, the second set of network slices is different from the first set of network slices. In some cases, the first and the second sets of network slices may overlap, i.e., may contain some common network slices.

In some embodiments, the second registration request message is sent with integrity protection. In such embodiments, the processor further validates the integrity of the second registration request message and skips authenticating the remote unit in response to successfully validating the integrity of the second registration request message. In certain embodiments, the processor establishes a Non-Access Stratum ("NAS") security context for the remote unit in response to establishing the first registration. In such embodiments, the processor uses the NAS security context to validate the second registration request message.

In some embodiments, the processor retrieves subscription data of the remote unit in response to receiving the first registration request message and prior to sending the first registration accept message. In such embodiments, the processor further skips retrieving the subscription data of the remote unit in response to successfully validating the integrity of the second registration request message.

In some embodiments, the processor retrieves first policy rules from a first policy control function ("PCF"). Moreover, the processor further selects a second PCF in response to receiving the second registration request message and retrieves (i.e., sends a request and receives a response) second policy rules from the second PCF. Here, the first policy rules are applicable to the first registration, while the second policy rules are applicable to the second registration.

In some embodiments, the processor derives a first interworking key (e.g., N3IWF key) during the establishment of the first registration. In such embodiments, the processor derives a second interworking key (e.g., N3IWF* key) based on the first interworking key and provides the second interworking key to the second interworking function. In certain embodiments, the first interworking key is applied to establish a secure data connection between the remote unit and the first interworking function, while the second interworking key is applied to establish a secure data connection between the remote unit and the second interworking function.

Disclosed herein is a first method for establishing multiple concurrent registrations with a mobile network, according to embodiments of the disclosure. The first method may be performed by an access management function in a mobile communication network, such as the AMF 143 and/or the network apparatus 600. The first method includes receiving a first registration request message from a remote unit via a first interworking function (e.g., N3IWF-1) in a mobile communication network and sending a first registration accept message to the remote unit via the first interworking function, where the first interworking function supports a first set of network slices. Here, the first registration request message contains a first registration type (e.g., type=Initial) and the first registration accept message contains a first allowed NSSAI.

The first registration accept message establishes a first registration between the remote unit and the mobile communication network via the first N3IWF. Here, the first registration enables access (i.e., by the remote unit) to a first subset of network slices identified by the first allowed NSSAI, where the first subset includes one or more slice identifiers (i.e., S-NSSAIs) from the first set of network slices supported by the first interworking function.

The first method further includes receiving a second registration request message from the remote unit via a second interworking function (e.g., N3IWF-2) sending a second registration accept message to the remote unit via the second interworking function, where the second interworking function supports a second set of network slices. Here, the second registration request message contains a second registration type (e.g., type=Additional) different from the first registration type, and the second registration accept message contains a second allowed NSSAI.

The second registration accept message establishes a second registration between the remote unit and the mobile communication network via the second interworking function, where the second registration is in addition to the first registration (i.e., is established without replacing or otherwise impacting the first registration). Here, the second registration enables access (i.e., by the remote unit) to a second subset of network slices identified by the second allowed NSSAI, where the second subset includes one or more slice identifiers (i.e., S-NSSAIs) from the second set of network slices supported by the second interworking function.

In some embodiments, the second registration is received in response to the remote unit determining that access to a particular network slice is required, but where the particular network slice is not included in the first subset of network slices (e.g., not included in the first allowed NSSAI). In some embodiments, the second registration request message contains a requested NSSAI (e.g., including a S-NSSAI of the particular network slice). In such embodiments, the first method further includes determining the second allowed NSSAI using the requested NSSAI and the second set of network slices. In certain embodiments, the second set of network slices is different from the first set of network slices. In some cases, the first and the second sets of network slices may overlap, i.e., may contain some common network slices.

In some embodiments, the second registration request message is sent with integrity protection. In such embodiments, the first method includes validating the integrity of the second registration request message and skipping authentication of the remote unit in response to successfully validating the integrity of the second registration request message. In certain embodiments, the first method further includes establishing a NAS security context for the remote unit in response to establishing the first registration and using the NAS security context to validate the second registration request message.

In some embodiments, the first method further includes retrieving subscription data of the remote unit in response to receiving the first registration request message and prior to sending the first registration accept message and skipping retrieval of the subscription data of the remote unit in response to successfully validating the integrity of the second registration request message.

In some embodiments, the first method further includes retrieving first policy rules from a first PCF, selecting a second PCF in response to receiving the second registration request message, and retrieving (e.g., sends a request and receives a response) second policy rules from the second PCF. Here, the first policy rules are applicable to the first registration, while the second policy rules are applicable to the second registration.

In some embodiments, the first method further includes deriving a first interworking key (e.g., N3IWF key) during the establishment of the first registration and deriving a second interworking key (e.g., N3IWF* key) based on the first interworking key and provides the second interworking key to the second interworking function. In certain embodiments, the first interworking key is applied to establish a secure data connection between the remote unit and the first interworking function, while the second interworking key is applied to establish a secure data connection between the remote unit and the second interworking function.

Disclosed herein is a second apparatus for establishing multiple concurrent registrations with a mobile network, according to embodiments of the disclosure. The second apparatus may be implemented by a user equipment device in a mobile communication network, such as the remote unit 105, the UE 205, and/or the user equipment apparatus 500, described above. The second apparatus includes a processor and a transceiver that communicates with an access management function (e.g., AMF) in a mobile communication network via a non-3GPP access network, said mobile communication network supporting a plurality of network slices.

The processor sends a first registration request message to the access management function via a first interworking function (e.g., N3IWF-1) and receives a first registration accept message from the access management function via the first interworking function, where the first interworking function supports a first set of network slices. Here, the first registration request message contains a first registration type (e.g., type=Initial) and the first registration accept message contains a first allowed NSSAI.

The first registration accept message establishes a first registration between the second apparatus and the mobile communication network via the first interworking function. Here, the first registration enables the second apparatus to access a first subset of network slices identified by the first allowed NSSAI, where the first subset includes one or more slice identifiers (i.e., S-NSSAIs) from the first set of network slices supported by the first interworking function.

Further, the processor sends a second registration request message to the access management function via a second interworking function (e.g., N3IWF-2) and receives a second registration accept message from the access management function via the second interworking function, where the second interworking function supports a second set of network slices. Here, the second registration request message contains a second registration type (e.g., type=Additional) different from the first registration type, and the second registration accept message contains a second allowed NSSAI.

The second registration accept message establishes a second registration between the apparatus and the mobile communication network via the second interworking function, where the second registration is in addition to the first registration (i.e., is established without replacing or otherwise impacting the first registration). Here, the second registration enables the second apparatus to access a second subset of network slices identified by the second allowed NSSAI, where the second subset includes one or more slice identifiers (i.e., S-NSSAIs) from the second set of network slices supported by the second interworking function.

In some embodiments, the processor sends the second registration request message in response to determining that access to a particular network slice is required, where the particular network slice is not included in the first subset of network slices (i.e., not included in the first allowed NSSAI). In some embodiments, the second registration request message contains a requested NSSAI (e.g., including a S-NSSAI of the particular network slice).

In some embodiments, the second registration request message is sent with integrity protection using an integrity key and algorithm negotiated during establishment of the first registration. In some embodiments, the processor derives a first interworking key (e.g., N3IWF key) during the establishment of the first registration, wherein the processor derives a second interworking key (e.g., N3IWF* key) based on the first interworking key. In certain embodiments, the processor further receives a notification message after sending the second registration request message and prior to receiving the second registration accept message, said notification message including additional information used to derive the second interworking key.

In some embodiments, the processor establishes a first data connection using the first registration and concurrently establishes a second data connection using the second registration, where the first and second data connections use different network slices. Here, the first data connection uses a network slice from the first subset of network slices (i.e., contained in the first allowed NSSAI) and the second data connection uses a network slice from the second subset of network slices (i.e., contained in the second allowed NSSAI). In certain embodiments, the first and second data connections are established via the non-3GPP access network. In certain embodiments, the first and second interworking functions each include a non-3GPP interworking function ("N3IWF").

Disclosed herein is a second method for establishing multiple concurrent registrations with a mobile network, according to embodiments of the disclosure. The second method may be performed by a user equipment device in a mobile communication network, such as the remote unit 105, the UE 205, and/or the user equipment apparatus 500. The second method includes sending a first registration request message to an access management function in a mobile communication network via a first interworking function in the mobile communication network (i.e., N3IWF-1) and receiving a first registration accept message from the access management function via the first interworking function, where the first interworking function supports a first set of network slices. Here, the first registration request message contains a first registration type (e.g., type=Initial) and the first registration accept message contains a first allowed NSSAI.

The first registration accept message establishes a first registration between the user equipment device and the mobile communication network via the first interworking function. Here, the first registration enables the user equipment device to access a first subset of network slices identified by the first allowed NSSAI, where the first subset includes one or more slice identifiers (i.e., S-NSSAIs) from the first set of network slices supported by the first interworking function.

The second method further includes sending a second registration request message to the access management function via a second interworking function (e.g., N3IWF-2) and receiving a second registration accept message from the access management function via the second interworking function, where the second interworking function supports a second set of network slices. Here, the second registration request message contains a second registration type (e.g., type=Additional) different from the first registration type and the second registration accept message contains a second allowed NSSAI.

The second registration accept message establishes a second registration between the user equipment device and the mobile communication network via the second interworking function, where the second registration is in addition to the first registration (i.e., is established without replacing or otherwise impacting the first registration). Here, the second registration enables the user equipment device to access a second subset of network slices identified by the second allowed NSSAI, where the second subset includes one or more slice identifiers (i.e., S-NSSAIs) from the second set of network slices supported by the second interworking function.

In some embodiments, the second method further includes sending the second registration request message in response to determining that access to a particular network slice is required, where the particular network slice is not included in the first subset of network slices. In some embodiments, the second registration request message contains a requested NSSAI (e.g., including a S-NSSAI of the particular network slice).

In some embodiments, the second registration request message is sent with integrity protection using an integrity key and algorithm negotiated during establishment of the first registration. In some embodiments, the second method includes deriving a first interworking key (e.g., N3IWF key) during the establishment of the first registration and deriving a second interworking key (e.g., N3IWF* key) based on the first interworking key. In certain embodiments, the second method further includes receiving a notification message after sending the second registration request message and prior to receiving the second registration accept message, said notification message comprising additional information used to derive the second interworking key.

In some embodiments, the second method further includes establishing a first data connection using the first registration and concurrently establishing a second data connection using the second registration, where the first and second data connections use different network slices. Here, the first data connection uses a network slice from the first subset of network slices (i.e., contained in the first allowed NSSAI) and the second data connection uses a network slice from the second subset of network slices (i.e., contained in the second allowed NSSAI). In certain embodiments, the first and second data connections are established via the non-3GPP access network. In certain embodiments, the first and second interworking functions each comprise a non-3GPP interworking function ("N3IWF").

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus in a mobile communication network, the apparatus comprising:

a network interface that communicates with a remote unit via at least one interworking function and that communicates with at least one network function in the mobile communication network, said mobile communication network supporting a plurality of network slices; and a processor that:

receives, from a remote unit via a first interworking function, a first registration request message containing a first registration type, wherein the first interworking function supports a first set of network slices;

sends, to the remote unit via the first interworking function, a first registration accept message containing a first allowed network slice selection assistance information ("NSSAI"), wherein the first registration accept message establishes a first registration between the remote unit and the mobile communication network via the first interworking function, and wherein the first registration enables access to a first subset of network slices identified by the first allowed NSSAI;

receives, from the remote unit via a second interworking function, a second registration request message containing a second registration type different from the first registration type, wherein the second interworking function supports a second set of network slices; and sends, to the remote unit via the second interworking function, a second registration accept message containing a second allowed NSSAI, wherein the second registration accept message establishes a second registration between the remote unit and the mobile communication network via the second interworking function in addition to the first registration, the second registration enabling access to a second subset of network slices identified by the second allowed NSSAI.

2. The apparatus of claim 1, wherein the second registration request message is received in response to the remote unit determining that access to a network slice is required, wherein the network slice is not included in the first subset of network slices.

3. The apparatus of claim 1, wherein the second registration request message contains a requested NSSAI, wherein the processor determines the second allowed NSSAI using the requested NSSAI and the second set of network slices.

4. The apparatus of claim 1, wherein the second registration request message is sent with integrity protection, wherein the processor further:

validates the integrity of the second registration request message; and skips authenticating the remote unit in response to successfully validating the integrity of the second registration request message.

5. The apparatus of claim 4, wherein the processor establishes a Non-Access Stratum ("NAS") security context for the remote unit in response to establishing the first registration, wherein the processor further uses the NAS security context to validate the second registration request message.

6. The apparatus of claim 4, wherein the processor retrieves subscription data of the remote unit in response to receiving the first registration request message and prior to sending the first registration accept message, wherein the processor further skips retrieving the subscription data of the remote unit in response to successfully validating the integrity of the second registration request message.

7. The apparatus of claim 1, wherein the processor retrieves first policy rules from a first policy control function ("PCF"), the first policy rules being applicable to the first registration, wherein the processor further:

selects a second PCF in response to receiving the second registration request message; and retrieves second policy rules from the second PCF, the second policy rules being applicable to the second registration.

8. The apparatus of claim 1, wherein the processor derives a first interworking key during the establishment of the first registration, wherein the processor derives a second interworking key based on the first interworking key and provides the second interworking key to the second interworking function.

9. The apparatus of claim 8, wherein the second interworking key is applied to establish a secure data connection between the remote unit and the second interworking function.

10. An apparatus comprising:

a transceiver that communicates with an access management function in a mobile communication network via a non-3GPP access network;

a processor that:

sends, to the access management function via a first interworking function, a first registration request message containing a first registration type, wherein the first interworking function supports a first set of network slices;

receives, from the access management function via the first interworking function, a first registration accept message containing a first allowed network slice section assistance information ("NSSAI"), wherein the first registration accept message establishes a first registration between the apparatus and the mobile communication network via the first interworking function, and wherein the first registration enables access to a first subset of network slices identified by the first allowed NSSAI;

sends, to the access management function via a second interworking function, a second registration request message containing a second registration type different from the first registration type, wherein the second interworking function supports a second set of network slices; and receives, from the access management function via the second interworking function, a second registration accept message containing a second allowed NSSAI, wherein the second registration accept message establishes a second registration between the apparatus and the mobile communication network via the second interworking function in addition to the first registration, the second registration enabling access to a second subset of network slices identified by the second allowed NSSAI.

11. The apparatus of claim 10, wherein the processor sends the second registration request message in response to determining that access to a network slice is required, wherein the network slice is not included in the first subset of network slices, wherein the second registration request message contains a requested NSSAI.

12. The apparatus of claim 10, wherein the second registration request message is sent with integrity protection using an integrity key and algorithm negotiated during establishment of the first registration.

13. The apparatus of claim 10, wherein the processor derives a first interworking key during the establishment of the first registration, wherein the processor derives a second interworking key based on the first interworking key.

14. The apparatus of claim 13, wherein the processor receives a notification message after sending the second registration request message and prior to receiving the second registration accept message, said notification message comprising additional information used to derive the second interworking key.

15. The apparatus of claim 10, wherein the processor establishes a first data connection using the first registration and concurrently establishes a second data connection using the second registration, wherein the first data connection and the second data connection use different network slices.

16. The apparatus of claim 15, wherein the first data connection and the second data connection are established via the non-3GPP access network, wherein the first and second interworking functions each comprise a non-3GPP interworking function ("N3IWF").

17. A method of a network function, the method comprising:

receiving, from a remote unit via a first interworking function in a mobile communication network, a first registration request message containing a first registration type, wherein the first interworking function supports a first set of network slices;

sending, to the remote unit via the first interworking function, a first registration accept message containing a first allowed network slice section assistance information ("NSSAI"), wherein the first registration accept message establishes a first registration between the remote unit and the mobile communication network via the first N3IWF, wherein the first registration enables access to a first subset of network slices identified by the first allowed NSSAI;

receiving, from the remote unit via a second interworking function, a second registration request message containing a second registration type different from the first registration type, wherein the second interworking function supports a second set of network slices; and sending, to the remote unit via the second interworking function, a second registration accept message containing a second allowed NSSAI, wherein the second registration accept message establishes a second registration between the remote unit and the mobile communication network via the second interworking function in addition to the first registration, the second registration enabling access to a second subset of network slices identified by the second allowed NSSAI.

18. The method of claim 17, wherein the second registration request message is received in response to the remote unit determining that access to a network slice is required, wherein the network slice is not included in the first subset of network slices, and wherein the second registration request message contains a requested NSSAI, the method further comprising determining the second allowed NSSAI using the requested NSSAI and the second set of network slices.

19. A method of a remote unit, the method comprising:

sending, to an access management function in a mobile communication network via a first interworking function in the mobile communication network, a first registration request message containing a first registration type, wherein the first interworking function supports a first set of network slices;

receiving, from the access management function via the first interworking function, a first registration request message containing a first allowed network slice section assistance information ("NSSAI"), wherein the first registration accept message establishes a first registration between the apparatus and the mobile communication network via the first N3IWF, and wherein the first registration enables access to a first subset of network slices identified by the first allowed NSSAI;

sending, to the access management function via a second interworking function, a second registration request message containing a second registration type different from the first registration type, wherein the second interworking function supports a second set of network slices; and receiving, from the access management function via the second interworking function, a second registration accept message containing a second allowed NSSAI, wherein the second registration accept message establishes a second registration between the apparatus and the mobile communication network via the second interworking function in addition to the first registration, the second registration enabling access to a second subset of network slices identified by the second allowed NSSAI.

20. The method of claim 19, further comprising sending the second registration request message in response to determining that access to a network slice is required, wherein the network slice is not included in the first subset of network slices.

* * * * *